Oct. 9, 1956  L. MOLYNEUX ET AL  2,766,095
RECORDING PHOTOMETERS
Filed Aug. 3, 1953  3 Sheets-Sheet 1

INVENTORS
LINDSAY MOLYNEUX
JAMES D. ROSE
ALBERT L. LATNER
BY Holcombe Wetherill & Brisebois
ATTORNEYS

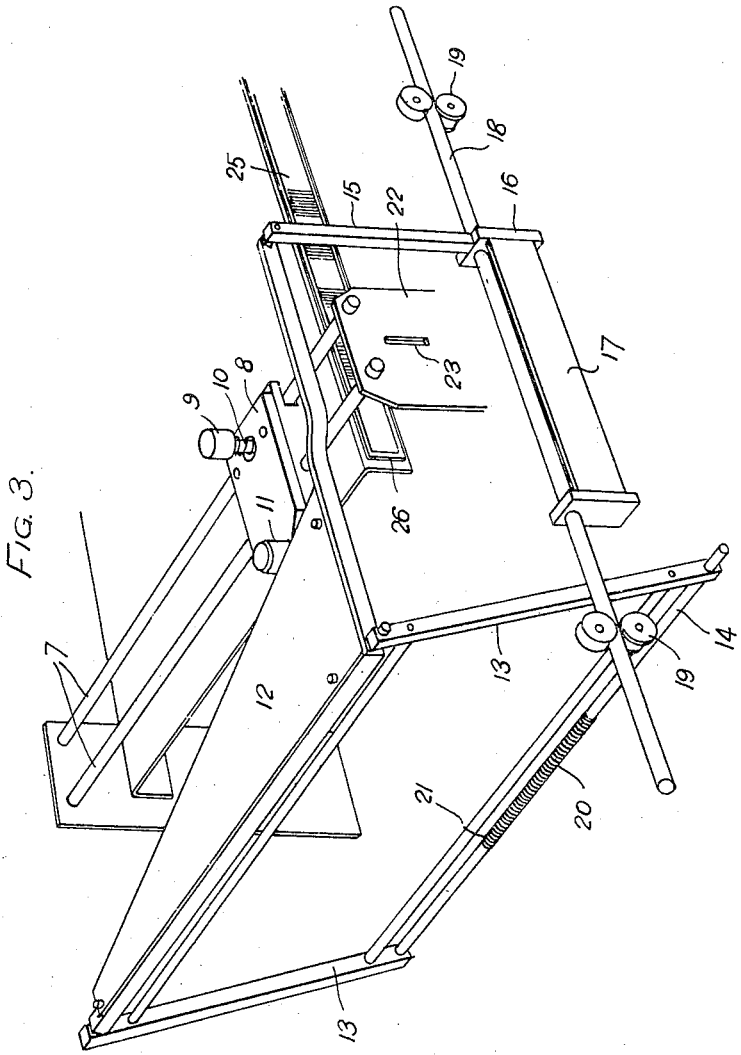

United States Patent Office 2,766,095
Patented Oct. 9, 1956

2,766,095

RECORDING PHOTOMETERS

Lindsay Molyneux, Newcastle-on-Tyne, James Dudfield Rose, Newcastle, and Albert Louis Latner, Newcastle-on-Tyne, England Application August 3, 1953, Serial No. 372,012

4 Claims. (Cl. 346—33)

This invention relates to recording photometers and has for its object to provide a reliable form of apparatus which will enable accurate recording of, for example, colour densities on paper or other material to be effected quickly.

According to the present invention, a recording photometer comprises a main traversible support for the material the characteristics of which are to be recorded, a support for a comparing member, for example an optical wedge, arranged to be traversed relatively to the main support, a record medium, such as graph paper, carried by the main support, a recording device traversible relatively to the recording medium and movable simultaneously with said comparing member, and means for establishing a predetermined relationship between said material and said comparing member.

In one form of apparatus according to the invention, the means for establishing said relationship comprises a light source, an obturator, an apertured mask, a photoelectric cell coupled to an amplifier circuit and a meter energised thereby, the arrangement being such that light from said source impinges alternately upon said material and said comparing member and the output of the photoelectric cell is dependent upon the light transmitted by, or reflected from, said material and the comparing device, the meter serving to indicate when a balance is obtained between the output due to said material and said comparing member.

One form of apparatus constructed and arranged to operate in accordance with the invention will now be described in greater detail by way of example with reference to the accompanying drawings in which:

Fig. 3 is a perspective view of some details and,

Figure 2:
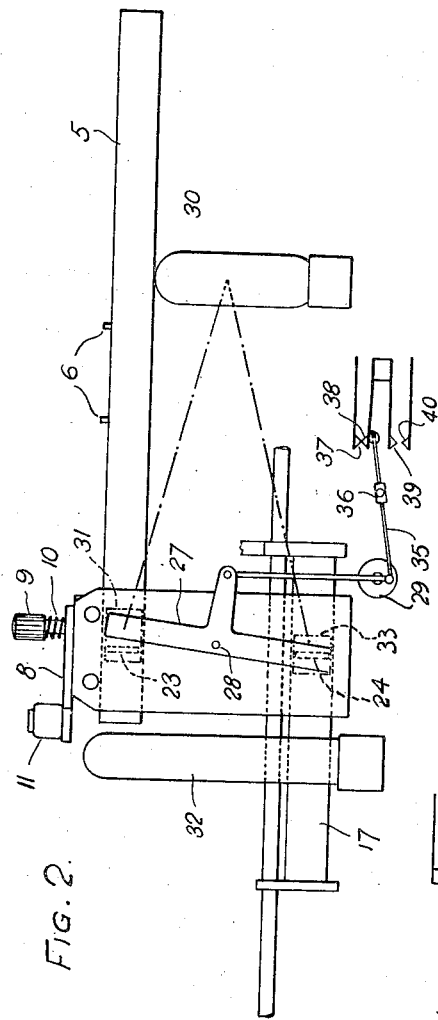
Fig. 2 is a front elevation of a portion of the apparatus.

Referring to the drawings, the apparatus comprises a framework including horizontal rods 1 supported by end plates 2 which also provide bearings for a further rod 3, rotatable by a handle 4. For a considerable part of its length the rod 3 is screw threaded to provide a lead screw drive for platform 5 which forms a flat supporting surface for a sheet of graph paper, not shown, but which is retained in position by pins 6 arranged to project through registering perforations in the graph paper.

The lead screw drive may, conveniently, comprise a half-nut through which the rod 3 passes, the half-nut being attached to the platform by a spring which permits release of the platform from the lead screw drive to allow the platform to be traversed freely on the rods 1.

Above the platform and slidable on rods 7 is a carrier 8 for a recording pen 9 the head of which is normally retained in the raised position by a spring 10. The graph paper is marked when desired, as will be described later, by depressing the head of the pen. The pen carrier 8 is provided with a boss 11 placed in co-operation with the edge of a metal wedge plate 12 carried by a linkage framework the side limbs 13 (Fig. 3) of which are pivotally supported on a fixed rod 14. The linkage includes a limb 15 attached to a carrier 16 for an optical wedge 17. The carrier 16 includes a guide rod 18 arranged to ride on pulleys 19 when the linkage is moved backwards and forwards. A helical spring 20 on the rod 14 and anchored to a cross bar 21 serves to urge the linkage forward so that the long edge of the wedge plate 12 is maintained lightly in contact with the boss 11.

A metal plate 22 supported by the rods 7 and constituting a mask, is formed with two slits 23 and 24 (Figs. 2 and 3) the slit 23 being arranged opposite the surface of a strip of test paper 25, the colour density of which is to be examined, the paper strip being carried in a holder 26 at one edge of the platform 5. The slit 24 is arranged opposite the optical wedge 17 and an obturator 27 pivoted at 28 is oscillated by a motor driven crank 29.

Figure 1:
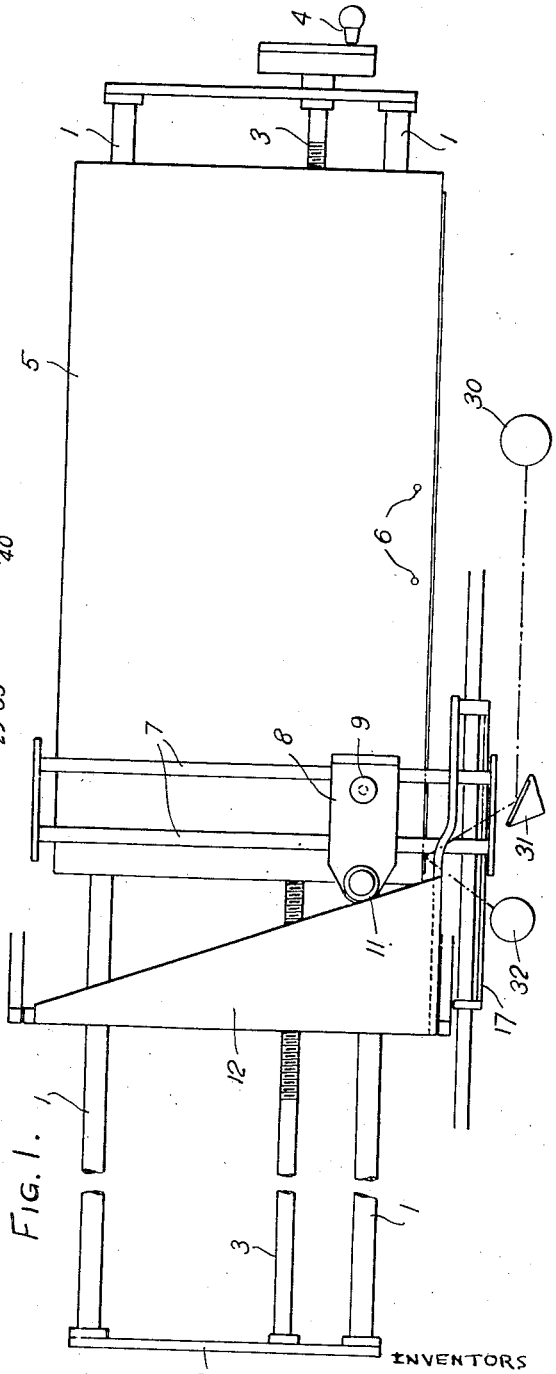
Fig. 1 is a plan view of the apparatus.

In the position of the obturator shown in Figs. 1 and 2, it masks the slit 24 but allows light from the electric lamp 30 reflected by a mirror 31 to pass through the slit 23 on to the test paper strip 25 from which the light is further reflected on to a photoelectric cell 32. The amount of light reflected from the paper will of course depend upon the colour density of the paper. In the other position of obturator 27, the slit 23 is masked and light from the lamp 30, reflected by a second mirror 33 shown in dotted lines in Fig. 2, passes through the slit 24 and thence through the optical wedge 17. Light transmitted by the wedge 17 is reflected back on to the photoelectric cell 32 by a further mirror not shown in Figs. 1, 2 or 3 but represented diagrammatically at 34 in Fig. 4.

The crank 29 for oscillating the obturator serves also to actuate a switch arm 35 mounted to slide in a pivoted holder 36 and serving, in the position shown in Fig. 2, to cause contacts 37 and 38 to engage. In the other position of the arm 35, contact 39 which is electrically common to contact 38 is caused to engage contact 40.

Figure 4:
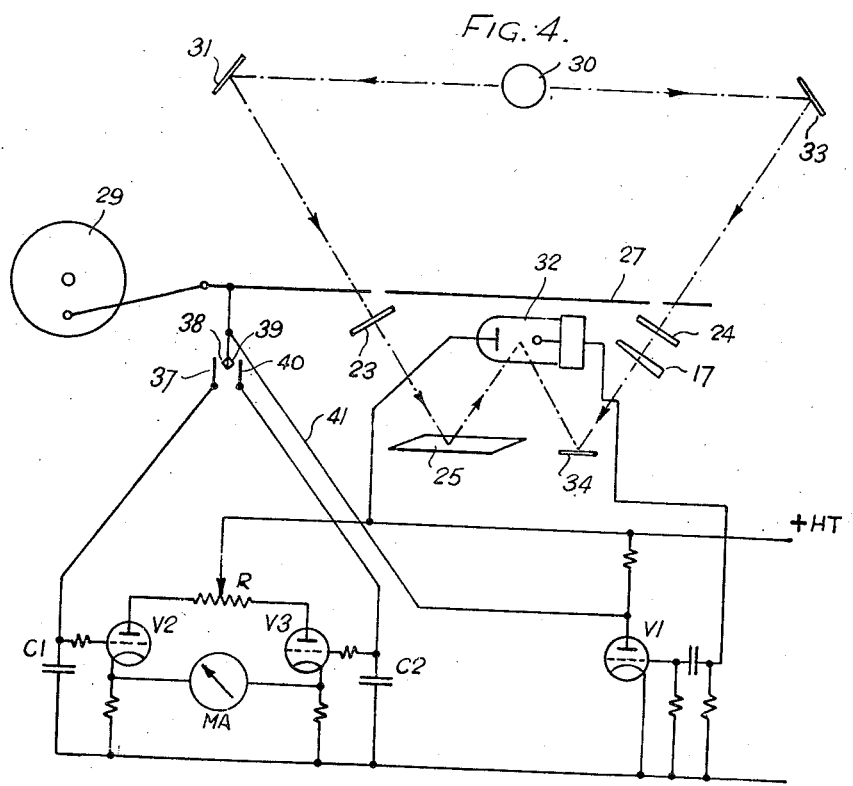
Fig. 4 is a circuit arrangement including a diagrammatic explanatory representation of the optical system.

Referring now more specifically to Fig. 4, a lead 41 from the common contacts 38, 39 etc. is connected to the output circuit of an amplifier valve V1, the input of which is resistance capacity coupled, as shown, to the output from the photoelectric cell 32. The fixed contacts 37, 40 are connected respectively to large capacity condensers C1 and C2 between the control grids of cathode follower valves V2, V3 respectively and ground and the cathode output leads of the valves are connected to a microammeter MA. The anodes of the cathode follower valves are connected through a common variable resistance R to a source of high tension supply, the variable resistance permitting an initial balance of the two valves to be effected.

The crank 29 which effects oscillation of the obturator 27 and switch arm 35 is arranged to operate so that the period of engagement of the movable contact pair 38—39 with the fixed contact 37, 40 is less than the period of exposure of the light paths associated with the individual fixed contacts. Transient conditions which might otherwise result on the changeover from one light path to the other are thus avoided.

It will be seen that the input to the individual cathode follower valves V2, V3 will be dependent upon the output from the photoelectric cell 32 at the instant the latter is coupled to them via the amplifier V1 and switch and in turn, the output of the photoelectric cell will depend upon the reflectivity of the area of the paper strip or the translucency of the portion of the optical wedge exposed at that instant. The microammeter serves to compare the alternate outputs and the position of the optical wedge is adjusted by moving the linkage carrying it until the outputs are balanced as demonstrated by zero reading of the microammeter. Adjustment of the linkage is accompanied by adjustment of the position of the recording pen carrier 8 by maintaining the long edge of the wedge plate 12 in contact with the boss 11 and when a balance is obtained for a given area of the strip of paper under test, the pen is depressed to record a dot on the graph paper.

The platform carrying the graph paper is moved by turning the handle 4 so that the platform 5 is traversed by its lead screw a millimetre at a time, the strip of paper under test being carried by the platform as already described. At each step of adjustment, the optical wedge is also adjusted as already described until the balance condition is obtained and the operation is then repeated until the full length of the strip of paper under test has been examined.

The apparatus may of course be used for obtaining a graphical record of colour densities on strips of paper or other material for a variety of purposes and one application lies in the field of electro phoresis where the concentration of a dye on filter paper is proportional to the content of a substance or substances in a liquid and it is desired to ascertain and record such content quickly.

Apparatus for carrying out the invention may of course take forms different from that described or modifications in detail may be made. Thus, although the paper strip and optical wedge are examined by reflected and transmitted light respectively, the optical arrangement may be modified so that the light from the lamp, after passing through the optical wedge, is incident directly on the photoelectric cell. Again, the paper under test may be examined by transmitted light, the paper being rendered translucent for this purpose by wetting it in a liquid which will not affect its colour contrasts.

It will be appreciated that the law relating the movement of the recording pen to the wedge movement and thus to colour concentration is determined by the contour of the edge of the plate 12 and such contour may take any desired form for example, parabolic depending upon the use to which the apparatus is put.

The apparatus may be made to operate automatically by appropriately synchronising the platform drive and that for the optical wedge and the recording pen, the latter in this case being arranged to be in continuous contact with the graph paper.

We claim:

1. A recording photometer comprising a movable support for a material the characteristics of which are to be recorded, means for moving said support along a rectilinear path, a stationary light source, a photo-electric cell, a first means including a portion of the material supported on said support, defining a first light path from said light source to said photo-electric cell, a second means defining a second light path from said light source to said photo-electric cell, an optical wedge interposed in said second light path and movably supported for rectilinear movement parallel to that of the support and transversely of the said second light path, obturator means for alternately interrupting the light transmitted over said first and second light paths, a recording medium supported on said movable support for movement therewith, a recording device movable transversely of the said movable support, means operatively connecting the said recording device with the optical wedge for concurrent movement, and means for effecting said concurrent movement thereby to vary the intensity of light of said second light path to equalise the light arriving at the photoelectric cell over said first and second light paths, and variably to position the said recording device with respect to the said recording medium.

2. A recording photometer as claimed in claim 1 wherein the said means operatively connecting the recording device with the optical wedge includes a guide member rigidly connected to said optical wedge for movement therewith, and an edge surface on said guide member extending transversely of the movable support and co-operating with said recording device for effecting said transverse movement of the recording device upon rectilinear movement of the optical wedge.

3. A recording photometer for recording colour characteristics of a material comprising a movable support for the material, a first light source, a light sensitive device in which an electric current varies with the luminous energy received by the device, a first means including a portion of the said material defining a first light path from said light source to said light sensitive device, means for effecting movement of said movable material support thereby variably to position the material relative to the said first light path, a second means defining a second light path from said light source to said light sensitive device, a light absorbing means interposed in said second light path and movable transversely thereof for progressively varying the intensity of light in said second path, a recording means, means operatively connecting said recording means to the movable light absorbing means, and means for effecting movement of said light absorbing means to vary the intensity of light in the second light path until the light arriving at said light sensitive device over said first and second light paths respectively is equal, and to effect corresponding operation of the recording means.

4. A recording photometer as claimed in claim 3 and including means for alternately interrupting the said first and second light paths whereby the said light sensitive device receives light alternately from the said light paths.

References Cited in the file of this patent

UNITED STATES PATENTS

| 1,806,198 | Hardy | May 19, 1931 |
| 2,380,231 | Giffen | July 10, 1945 |

FOREIGN PATENTS

| 747,498 | Germany | Sept. 27, 1944 |